United States Patent
NI et al.

(10) Patent No.: US 11,674,037 B2
(45) Date of Patent: Jun. 13, 2023

(54) COMPOSITION, AND FLAME-RETARDANT RESIN COMPOSITION

(71) Applicant: ADEKA CORPORATION, Tokyo (JP)

(72) Inventors: Yang NI, Saitama (JP); Yutaka Yonezawa, Saitama (JP); Naoko Tanji, Saitama (JP)

(73) Assignee: ADEKA CORPORATION, Tokyo (JP)

(*) Notice: Subject to any disclaimer, the term of this patent is extended or adjusted under 35 U.S.C. 154(b) by 522 days.

(21) Appl. No.: 16/638,241

(22) PCT Filed: Aug. 22, 2018

(86) PCT No.: PCT/JP2018/031030
§ 371 (c)(1),
(2) Date: Feb. 11, 2020

(87) PCT Pub. No.: WO2019/049668
PCT Pub. Date: Mar. 14, 2019

(65) Prior Publication Data
US 2020/0165448 A1 May 28, 2020

(30) Foreign Application Priority Data
Sep. 7, 2017 (JP) .............................. JP2017-172026

(51) Int. Cl.
| C08L 75/04 | (2006.01) |
| C08K 3/22 | (2006.01) |
| C08K 3/26 | (2006.01) |
| C08K 5/10 | (2006.01) |
| C08L 23/12 | (2006.01) |
| C08L 83/04 | (2006.01) |
| C08K 5/1515 | (2006.01) |
| C08K 5/3462 | (2006.01) |
| C08K 5/3492 | (2006.01) |
| C08K 5/52 | (2006.01) |

(52) U.S. Cl.
CPC .............. *C08L 75/04* (2013.01); *C08K 3/22* (2013.01); *C08K 3/26* (2013.01); *C08K 5/10* (2013.01); *C08K 5/1515* (2013.01); *C08K 5/3462* (2013.01); *C08K 5/34922* (2013.01); *C08K 5/5205* (2013.01); *C08L 23/12* (2013.01); *C08L 83/04* (2013.01); *C08K 2003/2227* (2013.01); *C08K 2003/2296* (2013.01); *C08L 2201/02* (2013.01)

(58) Field of Classification Search
None
See application file for complete search history.

(56) References Cited

U.S. PATENT DOCUMENTS

| 2007/0176154 | A1* | 8/2007 | Murase ................ C08K 5/5205 524/115 |
| 2010/0249286 | A1* | 9/2010 | Yamaki ................ C08K 5/0066 252/609 |
| 2012/0329920 | A1 | 12/2012 | Sato et al. |
| 2014/0200292 | A1* | 7/2014 | Okita ..................... C09K 21/12 252/609 |
| 2014/0288217 | A1 | 9/2014 | Hatanaka et al. |
| 2014/0309340 | A1* | 10/2014 | Schneider .............. C09K 21/12 252/607 |
| 2015/0005421 | A1* | 1/2015 | Schneider ............ C08K 5/5313 252/607 |

FOREIGN PATENT DOCUMENTS

| CN | 102869724 A | 1/2013 |
| CN | 103827197 A | 5/2014 |
| JP | 60-46923 | 3/1985 |
| JP | 6-263437 | 9/1994 |
| JP | 6-329411 | 11/1994 |
| JP | 11-21125 | 1/1999 |
| JP | 2000-086235 | 3/2000 |
| JP | 2000-239014 | 9/2000 |
| JP | 2001-261331 | 9/2001 |
| JP | 2001261976 | 9/2001 |
| JP | 2001-302236 | 10/2001 |
| JP | 2003-002641 | 1/2003 |
| JP | 2003-002642 | 1/2003 |
| JP | 2003176126 | 6/2003 |
| JP | 2003-221227 | 8/2003 |
| JP | 2003238150 | 8/2003 |
| JP | 2003-292819 | 10/2003 |
| JP | 2004-010720 | 1/2004 |
| JP | 2005-162912 | 6/2005 |
| JP | 2007-063346 | 3/2007 |
| JP | 2009-120717 | 6/2009 |
| WO | WO98/58876 | 12/1998 |
| WO | WO2005/080494 | 9/2005 |
| WO | WO 2012/161070 | 11/2012 |

OTHER PUBLICATIONS

English Language Translation of Example 8 in Table 2 of JP2005162912(A). JP2005162912(A) was published on Jun. 23, 2005.*
Anonymous, "Analysis of the precipitation problem of flame-retarding pp material and its solutions," Polymer and Additives, 2016, No. 3, p. 38, published on Dec. 31, 2016.
International Search Report, PCT/JP2018/031030, dated Oct. 9, 2018.

* cited by examiner

*Primary Examiner* — Joseph D Anthony
(74) *Attorney, Agent, or Firm* — Nixon & Vanderhye

(57) ABSTRACT

A composition contains the following components (A), (B), and (C), the component (A) being at least one melamine salt selected from the group consisting of melamine orthophosphate, melamine pyrophosphate, and melamine polyphosphate, the component (B) being at least one piperazine salt selected from the group consisting of piperazine orthophosphate, piperazine pyrophosphate, and piperazine polyphosphate, and the component (C) being a monohydrate of alumina. As disclosed, it is possible to provide a composition that can impart excellent levels of processability/moldability and flame retardancy to a resin by being mixed with the resin.

6 Claims, No Drawings

COMPOSITION, AND FLAME-RETARDANT RESIN COMPOSITION

TECHNICAL FIELD

The present invention relates to a composition that contains a phosphate salt of piperazine and a phosphate salt of melamine, and a flame retardant resin composition that contains the composition.

BACKGROUND ART

Synthetic resins have conventionally been used in a wide variety of applications such as construction materials, automobile parts, wrapping materials, agricultural materials, housing materials for household appliances, and toys due to their excellent chemical and mechanical properties. However, most synthetic resins are flammable substances, and thus they are required to be flame retardant depending on the application of the synthetic resins. As a method for imparting flame retardancy to a resin, a method is widely known in which a halogen-based flame retardant agent, an inorganic phosphorus-based flame retardant agent (as typified by red phosphorus or a polyphosphoric acid-based flame retardant agent such as ammonium polyphosphate), an organic phosphorus-based flame retardant agent (as typified by a triaryl phosphate ester compound), a metal hydroxide, and an antimony oxide compound and a melamine compound that are flame retardant aids are used alone or in combination.

In particular, an intumescent-based flame retardant agent is known that is composed mainly of polyphosphoric acid or pyrophosphoric acid and a salt of a nitrogen-containing compound and forms a surface swelling layer (intumescent layer) during combustion to suppress diffusion of decomposition products and heat transfer and thereby exhibit flame retardancy. Such a flame retardant agent is disclosed in Patent Literature 1, for example.

Patent Literature 2 proposes a flame retardant resin composition that contains a polyolefin-based resin, aluminum hydroxide, melamine polyphosphate or ammonium polyphosphate amide, and a carbonization agent. However, the composition disclosed in Patent Literature 2 has a problem in that because the heat resistance temperature of a dimer of pentaerythritol used as the carbonization agent is low, volatilization during combustion increases, and safety during combustion is impaired. In addition, there is also a problem with the moldability during processing because the composition contains a large amount of aluminum hydroxide which is an inorganic substance.

CITATION LIST

Patent Literature

Patent Literature 1: US 2014/200292A1
Patent Literature 2: JP 2004-010720A

SUMMARY OF INVENTION

There is increasing demand for fire protection in various applications where resin materials are used. Along with this trend, resin compositions are required to have higher levels of processability/moldability and flame retardancy.

However, conventional flame retardant agents described above are insufficient in terms of achieving both processability/moldability and a drip prevention effect.

It is an object of the present invention to provide a composition that can impart processability/moldability and flame retardancy to a resin by being mixed with the resin, and a flame retardant resin composition that contains the composition and a resin and has excellent levels of processability/moldability and flame retardancy.

The inventors of the present invention conducted in-depth studies on a configuration that solves the problems described above, and found that, when a composition that contains a monohydrate of alumina in addition to a combination of two specific types of phosphate salts of amines is mixed with a resin, the composition exhibits excellent levels of processability/moldability and flame retardancy.

The present invention has been made based on the findings described above, and provides a composition that contains the following components (A), (B), and (C), the component (A) being at least one melamine salt selected from the group consisting of melamine orthophosphate, melamine pyrophosphate, and melamine polyphosphate, the component being at least one piperazine salt selected from the group consisting of piperazine orthophosphate, piperazine pyrophosphate, and piperazine polyphosphate, and the component (C) being a monohydrate of alumina.

The present invention also provides a flame retardant resin composition that contains a resin and the composition described above, and a molded body that is formed from the flame retardant resin composition.

Also, the present invention provides a method for imparting flame retardancy to a resin, the method including mixing a composition that contains the above-described components (A), (B), and (C) with a resin.

Furthermore, the present invention provides use of a composition that contains the above-described components (A), (B), and (C) as a flame retardant agent.

DESCRIPTION OF EMBODIMENTS

Hereinafter, the present invention will be described in detail by way of a preferred embodiment thereof.

The term "flame retardancy" used in the description given below refers to the property of a substance being difficult to ignite, or being capable of ignition hut causing a flame to spread at a very low speed even when combustion continues, and thereafter being capable of self-extinguishment, and is preferably of a rating of at least V-2, and more preferably of a rating of V-1 or V-0 in flammability rating according to the UL-94V standard as described in Examples. The term "flame retardant agent composition" refers to a composition that contains one or more flame retardant agents. The term "flame retardant resin composition" refers to a composition that has the flame retardancy described above, and contains at least one synthetic resin.

A feature of the composition according to the present invention is that the composition contains all of the above-described components (A), (B), and (C).

The melamine salt used as the component (A) is selected from the group consisting of melamine orthophosphate, melamine pyrophosphate, and melamine polyphosphate. These melamine salts may be used alone or in a combination of two or more. Out of these, it is preferable to use melamine pyrophosphate from the viewpoint of flame retardancy, ease of handling, and storage stability. In the case where the melamine salt is used in a mixture, it is preferable that the mass-based content of melamine pyrophosphate is the highest in the mixture.

Such a salt of phosphoric acid and melamine can be obtained by reacting a corresponding phosphoric acid or phosphate salt with melamine. In particular, the melamine salt used as the component (A) of the present invention is preferably melamine pyrophosphate or melamine polyphosphate, more preferably melamine pyrophosphate obtained by heating and condensing melamine orthophosphate.

The piperazine salt used as the component (B) in the composition according to the present invention is selected from the group consisting of piperazine orthophosphate, piperazine pyrophosphate, and piperazine polyphosphate. These piperazine salts may be used alone or in a combination of two or more. Out of these, from the viewpoint of flame retardancy, ease of handling, and storage stability, it is preferable to use piperazine pyrophosphate. In the case where the piperazine salt is used in a mixture, it is preferable that the mass-based content of piperazine pyrophosphate is the highest in the mixture.

Such a salt of phosphoric acid and piperazine can be obtained by reacting a corresponding phosphoric acid or phosphate salt with piperazine. In particular, the piperazine salt used as the component (B) of the present invention is preferably piperazine pyrophosphate or piperazine polyphosphate, more preferably piperazine pyrophosphate obtained by heating and condensing piperazine orthophosphate.

In the composition according to the present invention, the amount of component (A) is preferably 10 to 50 parts by mass, and more preferably 20 to 40 parts by mass relative to 100 parts by mass of a total of the component (A) and the component (B). The amount of component (B) is preferably 90 to 50 parts by mass, and more preferably 80 to 60 parts by mass relative to 100 parts by mass of a total of the component (A) and the component (B). It is preferable to set the amount of component (A) and the amount of component (B) within the above-described ranges because, when the components (A) and (B) are combined with the component (C), which will be described later, the gas barrier property of an intumescent layer formed during combustion and the self-extinguishing property are improved.

Also, in the composition according to the present invention, the total amount of component (A) and the component (B) is preferably 70 to 99.9 mass %, and more preferably 80 to 99 mass %. The total amount of component (A) and the component (B) is preferably 70 mass % or more from the viewpoint of the effect of imparting flame retardancy, and is preferably 99.9 mass % or less from the viewpoint of ensuring an amount for the component (C) and other optional components and enhancing the effects of the present invention. The amount of melamine salt and the amount of piperazine salt in the composition according to the present invention can be measured using ion chromatography.

Next, the component (C) used in the composition according to the present invention will be described.

A feature of the composition according to the present invention is that a monohydrate of alumina is used as the component (C).

It has conventionally been known that a monohydrate of alumina has a poor flame retarding effect because the energy required for endothermic decomposition is much lower as compared with aluminum hydroxide. However, surprisingly, it has been found, as a result of studies conducted by the inventors of the present invention, that when a monohydrate of alumina is used in combination with the component (A) and the component (B) described above, a significant effect of imparting good flame retardancy and processability/moldability to a resin can be obtained.

In the present invention, "monohydrate of alumina" refers to an Al hydrated oxide represented by the formula: $Al_2O_3 \cdot nH_2O$ (where n is 1 or more and less than 2), and a composite of the hydrated oxide and aluminum hydroxide. Ordinarily, the monohydrate of alumina is an Al hydrated oxide represented by the formula: $Al_2O_3 \cdot nH_2O$ (where n is 1). However, in the present invention, even when n is less than 2, the same effects as those obtained when n is 1 can be obtained. As the monohydrate of alumina, AlOOH, or in other words, boehmite and diaspore represented by $½(Al_2O_3 \cdot H_2O)$, pseudo-boehmite, and the like can be used.

In the composition according to the present invention, in the case where boehmite is used as the component (C), the shape of boehmite is not limited to a particular shape, and may be a particulate shape (a spherical shape, an elliptic spherical shape, a cubic shape, a needle-like shape, a strip-like shape, or the like), or a plate-like shape (a disc shape, an elliptic disc shape, a polygonal plate-like shape such as a rectangular plate-like shape or a hexagonal plate-like shape, an amorphous plate-like shape such as a flake shape, or the like). In the case where boehmite has a particulate shape or a plate-like shape, the average particle size is preferably about 0.1 to 50 μm, more preferably about 0.3 to 30 μm, and even more preferably about 0.5 to 20 μm (particularly 1 to 10 μm.). The aspect ratio (the ratio of average particle size to thickness) of plate-like shaped boehmite is preferably about 5 or more, more preferably about 10 to 500, and even more preferably about 30 to 400. In the present invention, the average particle size of boehmite can be measured using a dry particle size distribution analyzer or a wet particle size distribution analyzer. Also, the thickness of plate-like shaped boehmite can be measured using, for example, a scanning electron microscope, a transmission electron microscope, or the like. Boehmite may be dispersed in a resin composition (in particular, a molded article) in the form of nano particles with a particle size of 0.1 μm or less (for example, 0.0001 to 0.1 μm).

Boehmite may be in the form of a layered stack. In the case where boehmite is in the form of a layered stack, an inorganic component, an organic component, and the like may be included between layers. Also, an inorganic component, an organic component, and the like may be bonded between layers. An inorganic component and an organic component may be bonded by, for example, an aluminum glycosidic bond represented by the formula: $AlO(OH)_x(O(CH_2)_mOH)_{1-x}$, (where x is a number less than 1, and m is a number of 2 to 10). Examples of the inorganic component include alkali metal compounds (compounds that contain sodium, potassium, and the like), alkaline earth metal compounds (compounds that contain magnesium, calcium, strontium, barium, and the like), inorganic acids (phosphoric acid, phosphates, and the like), and the like. Examples of the organic component include organic acids and salts thereof (alkaline earth metal salts of organic acid such as magnesium acetate, and the like), alcohol-based compounds ((Rots such as ethylene glycol, 1,2- or 1,3-propanediol, 1,3- or 1,4-butanediol, 1,6-hexanediol, and 1,4-cyclohexanedimethanol, and the like), amine-based compounds (alkanolamines such as triethanolamine, and the like), resins (hydroxyl group-containing resins such as polyvinyl alcohol, polyethylene glycol, and hydroxypropyl cellulose, and the like), and the like.

From the viewpoint of releasing hydrated water, boehmite has a specific surface area of preferably about 0.5 $m^2/g$ or more, more preferably about 1 $m^2/g$ or more (for example, 1 to 200 m/g), and even more preferably about 3 $m^2/g$ or more (particularly, 5 to 150 $m^2/g$). The specific surface area of boehmite can be measured using, for example, a permeability method or a gas adsorption method.

It is preferable to use boehmite that releases hydrated water at a high temperature (for example, a temperature higher than the molding temperature of a base resin) of preferably about 240° C. or more, more preferably about 330 to 700° C., and even more preferably about 350 to 650° C. (particularly, 400 to 600° C.). The temperature at which boehmite releases hydrated water can be measured using, for example, thermogravimetric analysis, or the like.

Specific examples of boehmite include those disclosed in JP S60-46921A, JP H6-263437A, JP H6-329411A, JP H11-21125A, JP 2000-86235A, JP 2000-239014A, JP 2001-261331A, JP 2001-261976A, JP 2001-302236A, JP 2003-2641A, JP 2003-2642A, JP 2003-176126A, JP 2003-221227A, JP 2003-238150A, JP 2003-292819A, and the like. Also, in the composition according to the present invention, commercially available products of boehmite can be used. Examples of the commercially available products of boehmite include: products named Cerasur available from Kawai Lime Industry Co., Ltd.) including, for example, BMB, BMT, BMB (33), BMT (33), BMM, BMF, BMI, and the like; products named Apyral available from Nabaltec GmbH including, for example, AOH180DE, AOH180DS, and the like; products named DISPAL available from Sasol North America Inc.; products named Nano Alumina available from Saint-Gobain Ceramic Materials including, for example, CAM 9010; and the like.

The monohydrate of alumina used in the composition according to the present invention can be produced using a known production method. For example, the monohydrate of alumina can be produced by precipitating a solution of sodium aluminate in a supersaturated state at a temperature less than 100° C. as disclosed in WO 98/58876A.

In the composition according to the present invention, the amount of component (C) is preferably 0.1 to 20 parts by mass relative to 100 parts by mass of a total of the component (A) and the component (B). From the viewpoint of flame retardancy, the amount of component (C) is preferably 0.5 to 20 parts by mass, more preferably 1 to 20 parts by mass, and even more preferably 3 to 10 parts by mass. It is advantageous to set the amount of component (C) to 0.1 parts by mass or more from the viewpoint of a drip prevention effect and an intumescent layer forming effect. On the other hand, from the viewpoint of machine contamination during processing and processability/moldability, it is advantageous to set the amount of component (C) to 20 parts by mass or less. The amount of a monohydrate of alumina contained in the composition according to the present invention can be measured using, for example, X-ray fluorescence analysis, or the like.

The composition according to the present invention may further contain zinc oxide (ZnO) (hereinafter, this component may also be referred to as "component (D)").

Zinc oxide functions as a flame retardant aid. Zinc oxide may be surface treated. Commercially available products of zinc oxide can be used. Examples thereof include zinc oxide class 1 (available from Mitsui Mining & Smelting Co., Ltd.), partially coated zinc oxide (available from Mitsui Mining & Smelting Co., Ltd.), Nano Fine 50 (super-fine zinc oxide particles with an average particle size of 0.02 μm available from Sakai Chemical Industry Co., Ltd.), Nano Fine K (super-fine zinc oxide particles coated by zinc silicate with an average particle size of 0.02 μm available from Sakai Chemical Industry Co., Ltd.), and the like.

From the viewpoint of flame retardancy, in the composition according to the present invention, the amount of zinc oxide that is the component (D) is preferably 0.01 to 10 parts by mass, more preferably 0.5 to 8 parts by mass, and even more preferably 1 to 5 parts by mass relative to 100 parts by mass of a total of the component (A) and the component (B). By setting the amount of zinc oxide to 0.01 parts by mass or more, flame retardancy is further improved. On the other hand, by setting the amount of zinc oxide to 10 parts by mass or less, processability is unlikely to be negatively affected.

The composition according to the present invention preferably further contains at least one (component E) selected from silicone oil, an epoxy-based coupling agent, a hydrotalcite, and a lubricant from the viewpoint of preventing aggregation of flame retardant agent powder, as well as improving storage stability, dispersibility to synthetic resin, and flame retardancy.

Examples of silicone oil include: dimethyl silicone oil in which all side chains and terminals of polysiloxane are methyl groups; methyl phenyl silicone oil in which side chains and terminals of polysiloxane are methyl groups and some of the side chains are phenyl groups; methyl hydrogen silicone oil in Which side chains and terminals of polysiloxane are methyl groups and some of the side chains are hydrogen; and copolymers thereof. It is also possible to use modified silicone oil modified by introducing an organic group to some of the side chains and/or the terminals of silicone oil. Examples thereof include amine-modified silicone oil, epoxy-modified silicone oil, alicyclic epoxy-modified silicone oil, carboxyl-modified silicone oil, carbinol-modified silicone oil, mercapto-modified silicone oil, polyether-modified silicone oil, long-chain alkyl-modified silicone oil, fluoroalkyl-modified silicone oil, higher-fatty acid ester-modified silicone oil, higher-fatty acid amide-modified silicone oil, silanol-modified silicone oil, diol-modified silicone oil, phenol-modified silicone oil, and/or aralkyl-modified silicone oil.

Specific examples of silicone oil are as follows. Examples of dimethyl silicone oil include KF-96 (available from Shin-Etsu Chemical Co., Ltd.), KF-965 (available from Shin-Etsu Chemical Co., Ltd.), KF-968 (available from Shin-Etsu Chemical Co., Ltd.), and the like. Examples of methyl hydrogen silicone oil include KF-99 (available from Shin-Etsu Chemical Co., Ltd.), KF-9901 (available from Shin-Etsu Chemical Co., Ltd.), HMS-151 (available from Gelest Inc.), HMS-071 (available from Gelest Inc.), HMS-301 (available from (Gelest Inc.), DMS-H21 (available from Gelest Inc.), and the like. Examples of methyl phenyl silicone oil include KF-50 (available from Shin-Etsu Chemical Co., Ltd.), KF-53 (available from Shin-Etsu Chemical Co., Ltd.), KF-54 (available from Shin-Etsu Chemical Co., Ltd.), KF-56 (available from Shin-Etsu Chemical Co., Ltd.), and the like. Examples of epoxy-modified products include X-22-343 (available from Shin-Etsu Chemical Co., Ltd.), X-22-2000 (available from Shin-Etsu Chemical Co., Ltd.), KF-101 (available from Shin-Etsu Chemical Co., Ltd.), KF-102 (available from Shin-Etsu Chemical Co., Ltd.), and KF-1001 (available from Shin-Etsu Chemical Co., Ltd.). Examples of carboxyl-modified products include X-22-3701E (available from Shin-Etsu Chemical Co., Ltd.). Examples of carbinol-modified products include X-22-4039 (available from Shin-Etsu Chemical Co., Ltd.), and X-22-4015 (available from Shin-Etsu Chemical Co., Ltd.). Examples of amine-modified products include KF-393 (available from Shin-Etsu Chemical Co., Ltd.), and the like.

In the composition according to the present invention, from the viewpoint of preventing aggregation of flame retardant agent powder, as well as improving storage stability and dispersibility to synthetic resin, out of the silicone oils, it is preferable to use methyl hydrogen silicone oil.

The epoxy-based coupling agent functions to prevent aggregation of flame retardant agent powder, improve storage stability, and impart water resistance and heat resistance. As the epoxy-based coupling agent, a compound that is represented by, for example, the general formula: A-$(CH_2)_k$—$Si(OR)_3$ and has an epoxy group can be used. In the formula, A represents an epoxy group, k is a number of 1 to 3, and R represents a methyl group or an ethyl group. The epoxy group as used herein may be a glycidoxy group or a 3,4-epoxycyclohexyl group.

Specific examples of the epoxy-based coupling agent include, as silane coupling agents that have an epoxy group, 2-(3,4-epoxycyclohexyl)ethyltrimethoxysilane, 3-glycidoxypropylmethyldimethoxysitane, 3-glycidoxypropyltrimethoxysitane, 3-glycidoxypropylmethyldiethoxysilane, 3-glycidoxypropyltriethoxysilane, glycidoxyoctyltrimethoxysilane, and the like.

Hydrotalcite, which is known as a natural product or a synthetic product is a complex salt compound composed of magnesium aluminum, hydroxyl groups, carbonate groups, and any crystal water. Examples of hydrotalcite include a hydrotalcite in which a portion of magnesium or aluminum is replaced with an alkali metal or another metal such as zinc, and a hydrotalcite in which hydroxyl groups and carbonate groups are replaced with other anion groups. Specific examples include a hydrotalcite represented by the following formula (3), and a hydrotalcite obtained by replacing the metals of the hydrotalcite represented by the following formula (3) with alkali metals. As Al—Li-based hydrotalcite, a compound represented by formula (4) can also be used.

[Chem. 1]

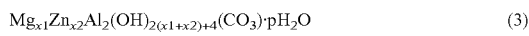

$$Mg_{x1}Zn_{x2}Al_2(OH)_{2(x1+x2)+4}(CO_3) \cdot pH_2O \tag{3}$$

where $x_1$ and $x_2$ represent numbers that satisfy $0 \leq x_2/x_1 < 10$ and $2 \leq x_1+x_2 \leq 20$, and p represents 0 or a positive number.

[Chem. 2]

$$[Li_{1/3}Al_{2/3}(OH)_2][A^{q-}{}_{1/3}qpH_2O] \tag{4}$$

where $A^{q-}$ represents a q-valent anion, and p represents 0 or a positive number.

Also, a portion of carbonate anions in the hydrotalcite may be replaced with other anions.

The hydrotalcite may be a hydrotalcite whose crystal water has been removed, or may be a hydrotalcite coated with a higher fatty acid such as stearic acid, a metal salt of a higher fatty acid such as an alkali metal salt of oleic acid, an organic metal salt of a sulfonic acid such as an alkali metal salt of dodecylbenzenesulfonic acid, a higher fatty acid amide, a higher fatty acid ester, wax, or the like.

Examples of lubricants include: pure hydrocarbon-based lubricants such as liquid paraffin, natural paraffin, micro wax, synthetic paraffin, low molecular weight polyethylene, and polyethylene wax; halogenated hydrocarbon-based lubricants; fatty acid-based lubricants such as a higher fatty acid and a hydroxy fatty acid; fatty acid amide-based lubricants such as a fatty acid amide and a bis-fatty acid amide; ester-based lubricants including lower alcohol esters of fatty acids, polyalcohol esters of fatty acids such as glyceride, polyglycol esters of fatty acids, and fatty alcohol esters of fatty acids (ester wax); metallic soap, fatty alcohols, polyalcohols, polyglycois, polyglycerols, partial ester-based lubricants such as partial esters of fatty acids and polyalcohols, partial esters of fatty acids, polyglycols and polyglycerols, silicone oil, mineral oil, and the like. These lubricants can be used alone or in a combination of two or more.

In the case where the composition according to the present invention further contains at least one (component E) selected from silicone oil, an epoxy-based coupling agent, a hydrotalcite, and a lubricant from the viewpoint of improving flame retardancy, the amount of component E in the composition according to the present invention is preferably 0.01 to 5 parts by mass, and more preferably 0.01 to 3 parts by mass relative to 100 parts by mass of a total of the component (A) and the component (B) from the viewpoint of effectively exhibiting the effect produced by inclusion of the component E.

In particular, in the case where silicone oil is contained, the amount of silicone oil is preferably 0.01 to 3 parts by mass, and more preferably 0.1 to 1 part by mass relative to 100 parts by mass of a total of the component (A) and the component (B) from the viewpoint of enhancing the above-described effect produced by the inclusion of silicone oil.

In particular, in the case where an epoxy-based coupling agent is contained in the composition according to the present invention, the amount of epoxy-based coupling agent is preferably 0.01 to 3 parts by mass, and more preferably 0.1 to 1 part by mass relative to 100 parts by mass of a total of the component (A) and the component (B) from the viewpoint of enhancing the above-described effect produced by the inclusion of the epoxy-based coupling agent.

In particular, in the case where a hydrotalcite is contained in the composition according to the present invention, the amount of hydrotalcite is preferably 0.01 to 5 parts by mass, and more preferably 0.1 to 0.5 parts by mass relative to 100 parts by mass of a total of the component (A) and the component (B) from the viewpoint of enhancing the above-described effect produced by including the hydrotalcite.

In the case where a lubricant is contained in the composition according to the present invention, the amount of lubricant is preferably 0.01 to 3 parts by mass, and more preferably 0.07 to 0.5 parts by mass relative to 100 parts by mass of a total of the component (A) and the component (B) from the viewpoint of enhancing the above-described effect produced by including the lubricant.

The composition used in the present invention may optionally contain a phenol-based antioxidizing agent, a phosphite-based antioxidizing agent, a thioether-based antioxidizing agent, other antioxidizing agents, a nucleating agent, an ultraviolet absorbing agent, a light stabilizing agent, a plasticizing agent, a filler, a fatty acid metal salt, an antistatic agent, a pigment, a dye, and the like.

These components may be blended with the composition according to the present invention in advance, or may be blended with a synthetic resin when the synthetic resin is blended. It is preferable to blend these components because the synthetic resin is stabilized.

Examples of the phenol-based antioxidizing agent include 2,6-di-tert-butyl-4-methylphenol, 2,6-di-test-butyl-4-ethylphenol, 2-tert-butyl-4,6-dimethylphenol, styrenated phenol, 2,2'-methytenebis(4-ethyl-6-tert-butylphenol), 2,2'-thiobis-(6-tert-butyl-4-methylphenol), 2,2'-thiodiethytenebis[3-(3,5-di-tert-butyl-4-hydroxyphenyl) propionate], 2-methyl-4,6-bis(octylsulfanylmethyl)phenol, 2,2'-isobutylidenebis(4,6-dimethylphenol), isooctyl-3-(3,5-di-tert-butyl-4-hydroxyphenyl)propionate, N,N'-hexane-1, 6-diylbis[3-(3,5-di-tert-butyl-4-hydroxyphenyl)propionamide, 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylenebis(4,6-ditert-butylphenol), 3,5-di-tert-butyl-4-hydroxybenzenepropionic acid and $C_{13-15}$ alkyl esters, 2,5-di-tert-amylhydroquinone, hindered phenol polymer (product name AO.OH.98 available from Adeka Palmarole Sas), 2,2'-methytenebis[6-(1-methytcyclohexyl)-p-cresol], 2-tert-butyl-6-(3-tert-butyl-2-hydroxy-5-methylbenzyl)-4-methylphenylacrylate, 2-[1-(2-hydroxy-3,5-di-tert-pentyl phenyl)ethyl]-4,6-di-tert-pentyl phenylacrylate, 6-[3-(3-tert-butyl-4-hydroxy-5-methyl)propoxy]-2,4,8,10-tetra-tert-butylbenz[d,f][1,3,2]-dioxaphosphobin, hexamethytenebis[3-(3,5-di-tert-butyl-4-hydroxyphenyl)propionate, bis[monoethyl(3,5-di-tert-butyl-4-hydroxyhenzyl) phosphonate] calcium salt, a reaction product of 5,7-bis(1,1-dimethylethyl)-3-hydroxy-2(3H)-benzofuranone and o-xylene, 2,6-di-tert-butyl-4-(4,6-bis(octylthio)-1,3,5-triazine-2-ylamino)phenol, DL-α-tocopherol (vitamin E), 2,6-bis(α-methylbenzyl)-4-methylphenol, bis[3,3-bis-(4'-hydroxy-3'-tert-butyl-phenyl)butanoic acid]glycol ester, 2,6-di-tert-butyl-p-cresol, 2,6-diphenyl-4-octadecytoxy phenol, stearyl(3,5-di-tert-butyl-4-hydroxyphenyl)propionate, distearyl(3,5-di-tert-butyl-4-hydroxybenzyl)phosphonate, tridecyl-3,5-tert-butyl-4-hydroxyhenzylthioacetate, thiodiethylenebis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butyl phenyl)butyric acid]glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butyl phenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-di-tert-butyl-4'-hydroxyphenyl)propionate]methane, 2-tert-butyl-4-methyl-6-(2-acryloyloxy-3-test-butyl-5-methylbenzyl)phenol, 3,9-bis[2-[3-(3-tert-butyl-4-hydroxy-5-methylphenyl)propanoyloxy]-1,1-dimethytethyl]-2,4,8,10-tetraoxaspiro[5.5]undecane, triethylene glycolbis[3-tert-4-hydroxy-5-methylphenyl)propionate], stearyl-3-(3,5-di-tert-butyl-4-hydroxyphenyl)propionic acid amide, palmityl-3-(3,5-di-tert-butyl-4-hydroxyphenyl)propionic acid amide, myristyl-3-(3,5-di-tert-butyl-4-hydroxyphenyl)propionic acid amide, lauryl-3-(3,5-di-tert-butyl-4-hydroxyphenyl)propionic acid amide, other 3-(3,5-dialkyl-4-hydroxyphenyl)propionic acid derivatives, and the like. These phenol-based antioxidizing agents may be used alone or in a combination of two or more.

The amount of phenol-based antioxidizing agent used when blended with a resin is preferably 0.001 to 5 parts by mass, and more preferably 0.01 to 1.0 part by mass relative to 100 parts by mass of the flame retardant resin composition.

Examples of the phosphite-based antioxidizing agent include triphenyl phosphite, diisooctyl phosphite, heptakis(dipropylene glycoptriphosphite, tri-isodecyl phosphite, diphenylisooctyl phosphite, diisooctyl phenyl phosphite, diphenyl tridecyl phosphite, triisooctyl phosphite, trilauryl phosphite, diphenylphosphite, tris(dipropylene glycol)phosphite, di-isodecyl pentaerythritol diphosphite, dioleoyl hydrogen phosphite, tritauryitrithio phosphite, bis(tridecyl) phosphite, tris(isodecyl)phosphite, tris(tridecyl)phosphite, diphenyl decyl phosphite, dinonyl phenylbis(nonylphenyl) phosphite, poly(dipropylene glycol)phenylphosphite, tetraphenyldipropylene glycol diphosphite, tris nonylphenyl phosphite, tris(2,4-di-tert-butylphenyl)phosphite, tris(2,4-di-tert-butyl-5-methylphenyl)phosphite, tris[2-tert-butyl-4-(3-tert-butyl-4-hydroxy-5-methylphenylthio)-5-methylphenyl]phosphite, tri(decyl)phosphite, octyldiphenylphosphite, di(decyl)monophenylphosphite, distearylpentaerythritol diphosphite, a mixture of distearylpentaerythritol and stearic acid calcium salt, alkyl (C10) bisphenol A phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetraphenyl-tetra(tridecyl)pentaerythritol tetraphosphite, bis(2,4-di-tert-butyl-6-methylphenyl)ethylphosphite, tetra(tridecyl) isopropylidene diphenyl diphosphite, tetra(tridecyl)-4,4'-n-butylidenebis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butyl phenyl)biphenylene diphosphonite, 9,10-dihydro-9-oxa-10-phosphaphenanthrene-10-oxide, (1-methyl-1-propenyl-3-ylidene)tris(1,1-dimethyethyl)-5-methyl-4,1-phenylene) hexatridecylphosphite, 2,2'-methylenebis(4,6-di-tert-butylphenyl)-2-ethythexylphosphite, 2,2'-methytenebis(4,6-di-tert-butylphenyl)-octadecylphosphite, 2,2'-ethylidenebis(4,6-di-tert-butylphenyl)fluorophosphite, 4,4'-butylidenebis(3-methyl-6-tert-butylphenyltridecyl)phosphite, tris(2-[(2,4,8,10-tetrakis-tert-butyldibenzo[d,f][1,3,2]dioxaphosphepin-6-yl)oxy]ethyl)amine, 3,9-bis(4-nonylphenoxy)-2,4,8,10-tetraoxa-3,9-diphosphesspiro[5,5]undecane, 2,4,6-tri-tert-butyl phenyl-2-butyl-2-ethyl-1,3-propanediol phosphite, 4,4'-isopropylidene diphenol $C_{12-15}$ alcohol phosphite, 3,9-bis(2,6-di-tert-butyl-4-methylphenyl)-3,9-bis-diphospha-2,4,8,10-tetraoxa-3,9-diphosphesspiro[5,5]undecane, diphenyl(isodecyl)phosphite, biphenyl diphenyl phosphite, and the like. These phosphite-based antioxidizing agents can be used alone or in a combination of two or more.

The amount of phosphite-based antioxidizing agent used when blended with a resin is preferably 0.001 to 5 parts by mass, and more preferably 0.01 to 1.0 part by mass relative to 100 parts by mass of the flame retardant resin composition.

Examples of the thioether-based antioxidizing agent include 3,3'-thiodipropionic acid, alkyl ($C_{12-14}$) thiopropionic acid, di(lauryl)-3,3'-thiodipropionate, 3,3'-thiobis propinoic acid ditridecyl, di(myristyl)-3,3'-thiodipropionate, di(stearyl)-3,3'-thiodipropionate, di(octadecyl)-3,3'-thiodipropionate, stearylthiodipropionate, tetrakis[methylene-3-(dodecylthio)propionate]methane, thiobis(2-tert-butyl-5-methyl-4,1-phenylene)bis(3-(dodecylthio)propionate), 2,2'-thiodiethytenebis(3-aminobutenoate), 4,6-bis(octylthiomethyl)-o-cresol, 2,2'-thiodiethytenebis[3-(3,5-di-tert-butyl-4-hydroxyphenypl)propionate], 2,2'-thiobis(4-methyl-6-tert-butylphenol), 2,2'-thiobis(6-tert-butyl-p-cresol), 2-ethylhexyl-(3,5-di-tert-butyl-4-hydroxybenzyl)thioacetate, 4,4'-thiobis(6-tert-butyl-3-methylphenol), 4,4'-thiobis(4-methyl-6-tert-butylphenol), 4,4'-[thiobis(methylene)]bis(2-tert-butyl-6-methyl-1-hydroxybenzyl), bis(4,6-di-tert-butyl phenol-2-yl)sulfide, tridecyl-3,5-di-tert-butyl-4-hydroxybenzylthioacetate, 1,4-bis(octylthiomethyl)-6-methylphenol, 2,4-bis(dodecyithiomethyl)-6-methylphenol, distearyl-disulfide, bis(methyl-4-[3-n-alkyl ($C_{12}$/$C_{14}$) thiopropionyloxy]5-tert-butyl phenyl)sulfide, and the like. These thioether-based antioxidizing agents can be used alone or in a combination of two or more.

The amount of thioether-based antioxidizing agent used when blended with a resin is preferably 0.001 to 5 parts by mass, and more preferably 0.01 to 1.0 part by mass relative to 100 parts by mass of the flame retardant resin composition.

Examples of the other antioxidizing agents include N-benzyl-α-phenyl nitrone, N-ethyl-α-methyl nitrone, N-octyl-α-heptyl nitrone, N-lauryl-α-undecyl nitrone, N-tetradecyl-α-tridecyl nitrone, N-hexadecyl-α-pentadecyl nitrone, N-octyl-α-heptadecyl nitrone, N-hexadecyl-α-heptadecyl nitrone, N-octadecyl-α-pentadecyl nitrone, N-heptadecyl-α-heptadecyl nitrone, N-octadecyl-α-heptadecyl nitrone, and other nitrone compounds, 3-arylbenzofuran-2(3H)-one, 3-(alkoxyphenyl)benzofuran-2-one, 3-(acyloxyphenyl)benzofuran-2(314)-one, 5,7-di-tert-butyl-3-(3,4-dimethylphenyl)-benzofuran-2(3H)-one, 5,7-di-tert-butyl-3-(4-hydroxyphenyl)-benzofuran-2(3 H)-one, 5,7-di-tert-butyl-3-{4-(2-hydroxyethoxy)phenyl}-benzofuran-2(3H)-one, 6-(2-(4(5,7-di-tert-2-oxo-2,3-dihydrobenzofuran-3-yl)phenoxy)ethoxy)-6-oxohexyl-6-((6-hydroxyhexanoyl)oxy)hexanoate, 5-di-tert-butyl-3-(4-((15-hydroxy-3,6,9,13-tetraoxapentadecyl)oxy)phenyl)benzofuran-2(3H)one, and other benzofuran compounds, and the like. These other antioxidizing agents can be used alone or in a combination of two or more.

The amount of other antioxidizing agents used when blended with a resin is preferably 0.001 to 5 parts by mass, and more preferably 0.01 to 1.0 part by mass relative to 100 parts by mass of the flame retardant resin composition.

Examples of the nucleating agent include sodium benzoate, 4-tert-butylbenzoic acid aluminum salt, sodium adipate, 2-sodiumbicyclo[2,2.1]heptane-2,3-dicarboxylate, and other carboxylic acid metal salts, sodium bis(4-tert-butylphenyl)phosphate, sodium-2,2'-methylenebis(4,6-di-tert-butylphenyl)phosphate, lithium-2,2'-methylenebis(4,6-di-tert-butylphenyl)phosphate, and other phosphoric acid ester metal salts, dibenzylidene sorbitol, bis(methylbenzylidene) sorbitol, bis(3,4-dimethylbenzylidene)sorbitol, bis(p-ethylbenzylidene)sorbitol, bis(dimethylbenzylidene)sorbitol, 1,2,3-trideoxy-4,6:5,7-bis-O-((4-propylphenyl)methylene)-nonitol, 1,3:2,4-bis(p-methylbenzylidene)sorbitol, 1,3:2,4-bis-O-benzylidene-D-glucitol (dibenzylidene sorbitol), and other polyalcohol derivatives, N,N',N"-tris[2-methylcyclohexyl]-1,2,3-propanetricarboxamide, N,N',N"-tricyclohexyl-1,3,5-benzenetricarboxamide, N,N'-dicyclohexyl-naphthalene dicarboxamide, 1,3,5-tri(dimethyl isopropoyl amino)benzene, and other amide compounds, and the like. These nucleating agents can be used alone or in a combination of two or more. The amount of nucleating agent used when blended with a resin is preferably 0.001 to 5 parts by mass, and more preferably 0.01 to 1.0 part by mass relative to 100 parts by mass of the flame retardant resin composition.

Examples of the ultraviolet absorbing agent include 2,4-dihydroxy henzophenon, 5,5'-methylenebis(2-hydroxy-4-methoxybenzophenon), 2-hydroxy-4-n-octoxybenzophenon, 2-hydroxy-4-methoxybenzophenon, 2-hydroxy-4-dodecytoxybenzophenon, 2,2'-dihydroxy-4-methoxybenzophenone, and other benzophenone-based ultraviolet absorbing agents, 2-(2-hydroxy-5-methylphenyl) benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazote, 2-(2-hydroxy-3,5-dicumylphenyl) benzotriazole, 2,2'-methylenebis(4-tert-octyl-6-benzotriazolylphenol), 2-(2-hydroxy-3-tert-butyl-5-carboxyphenyl)benzotriazole, and other polyethylene glycol esters, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butyl phenyl]-5-chlorobertzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole, 2-[2-hydroxy-4-(3-methaeryloyloxypropyl)phenyl]benzotriazote, and other benzotriazole-based ultraviolet absorbing agents, phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tern-butyl-4-hydroxy)benzoate, octadecyl(3,5-di-tert-butyl-4-hydroxy)benzoate, behenyl(3,5-di-tert-butyl-4-hydroxy)benzoate, and other benzoate-based ultraviolet absorbing agents, 2-ethyl-2'-ethoxy oxalanilide, 2-ethoxy-4'-dodecyl oxalanilide, 2-ethyl-2'-ethoxy-5'-tert-butyl-oxalanilide, and other substituted-oxalanilide-based ultraviolet absorbing agents, ethyl-α-cyano-β,β-diphenylacrylate, methyl-2-cyano-3-methyl-3-(p-methoxyphenyl)acrylate, tetrakis(α-cyano-(β,β-diphenytacryloyloxymethyl) methane, and other cyanoacrylate-based ultraviolet absorbing agents, 2-(2-hydroxy-4-(2-(2-ethylhexanoyloxy) ethyloxy)-4,6-diphenyl-1,3,5-triazine, 2,4,6-tris(2-hydroxy-4-hexyloxy-3-methylphenyl)-1,3,5-triazine, 2-(2-hydroxy-4-octylfoxyphenyl)-4,6-bis(2,4-dimethylphenyl)-1,3,5-triazine, 2-(4,6-diphenyl-1,3,5-triazine-2-yl)-5-hexyloxyphenol, 2-(4,6-di(1,1'-biphenyl)4-yl)-1,3,5-triazine-2-yl)-5-(2-ethylhexyloxy)phenol, and other triazine-based ultraviolet absorbing agents. These ultraviolet absorbing agents can be used alone or in a combination of two or more.

The amount of ultraviolet absorbing agent used when blended with a resin is preferably 0.001 to 5 parts by mass, and more preferably 0.05 to 0.5 parts by mass relative to 100 parts by mass of the flame retardant resin composition.

Examples of the tight stabilizing agent include 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetraethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl)di(tridecyl)-1,2,3,4-butane tetracarboxylate, bis(1,2,6,6-pentamethyl-4-piperidyl)-di(tridecyl)-1,2,3,4-butane tetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-yl]-1,5,8,12-4-azadodecane, 1,5,8,12-tetrakis[2,4-bis(N-butyl-N-(1,2,2,6,6-pentamethyl-4-piperidyl)amino)-s-triazine-6-yl]-1,5,8-12-4-azadodecane, 1,6,11-tris[2,4-bis(N-butyl-N-(2,2,6,6-tetramethyl-4-piperidyl)amino)-s-triazine-6-yl]amino undecane, 1,6,11-tris[2,4-bis(N-butyl-N-(1,2,2,6,6-pentamethyl-4-piperidyl)amino)-s-triazine-6-yl]amino undecane, bis{4-(1-octyloxy-2,2,6,6-tetramethyl) piperidyl}decanedionate, bis{4-(2,2,6,6-tetramethyl-1-undecyloxy)piperidyl}carbonate, TINUVINNOR 371 available from Ciba Specialty Chemicals, 2,2,6,6-tetramethyl-4-piperidylmethaerylate, 1,2,3,4-butanetetracarboxylic acid, a polymer of 2,2-bis(hydroxymethyl)-1,3-propanediol and 3-hydroxy-2,2-dimethylpropane, 1,2,2,6,6-pentamethyl-4-piperidinyl ester, 1,3-bis(2,2,6,6-tetramethylpiperidine-4-yl) 2,4-ditridecylbenzene-1,2,3,4,tetracarhoxylate, bis(1-octyloxy-2,2,6,6-pentamethyl-4-piperidyl)sebacate, poly [[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]), and the like. These light stabilizing agents can be used alone or in a combination of two or more.

The amount of light stabilizing agent used when blended with a resin is preferably 0.001 to 5 parts by mass, and more preferably 0.005 to 0.5 parts by mass relative to 100 parts by mass of the flame retardant resin composition.

Examples of the plasticizing agent include epoxidized soybean oil, epoxidized linseed oil, an epoxidized fatty acid octyl ester, and other epoxy-based plasticizing agents, methacrylate-based plasticizing agents, a polycondensate of dicarboxylic acid and polyalcohol, a polycondensate of polyvalent carboxylic acid and polyalcohol, and other polyester-based plasticizing agents, a polycondensate of dicarboxylic acid, polyalcohol and alkylene glycol, a polycondensate of dicarboxylic acid, polyalcohol and arylene glycol, a polycondensate of a polyvalent carboxylic acid, polyalcohol and alkylene glycol, a polycondensate of a polyvalent carboxylic acid, polyalcohol and arylene glycol, and other polyether ester-based plasticizing agents, an adipic acid ester, a succinic acid ester, and other fatty acid ester-based plasticizing agents, a phthalic acid ester, a terephthalic acid ester, a trimellitic acid ester, a pyromellitic acid ester, a benzoic acid ester, and other aromatic ester-based plasticizing agents, and the like. These plasticizing agents can be used alone or in a combination of two or more.

The amount of plasticizing agent used when blended with a resin is preferably 0.1 to 500 parts by mass, and more preferably 1 to 100 parts by mass relative to 100 parts by mass of the flame retardant resin composition.

Examples of the filler include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fiber, clay, dolomite, mica, silica alumina, potassium titanate whisker, wollastonite, fibrous magnesium oxysulfate, montmorillonite, and the like. The particle size (fiber diameter or fiber length and aspect ratio in the case where the filler is fibrous) may be selected as appropriate. These fillers can be used alone or in a combination of two or more.

The amount of filler used when blended with a resin is preferably 1 to 100 parts by mass, and more preferably 3 to 80 parts by mass relative to 100 parts by mass of the flame retardant resin composition.

Examples of fatty acids in the fatty acid metal salt include capric acid, 2-ethylhexanoic acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, cerotic acid, montanic acid, melissic acid, and other saturated fatty acids, 4-decenoic acid, 4-dodecenoic acid, palmitoleic acid, α-linolenic acid, linoleic acid, γ-linolenic acid, stearidonic acid, petroselinic acid, oleic acid, elaidic acid, vaccenic acid, eicosapentaenoic acid, docosapentaenoic acid, docosahexaenoic acid, and other linear unsaturated fatty acids, trimesic acid, and other aromatic fatty acids. In particular, it is preferable to use a saturated fatty acid such as myristic acid, stearic acid, or 12-hydroxystearic acid. Examples of metals in the fatty acid metal salt include alkali metal, magnesium, calcium, strontium, barium, titanium, manganese, iron, zinc, silicon, zirconium, yttrium, barium, hafnium, and the like. In particular, it is preferable to use alkali metals such as sodium, lithium, and potassium. These fatty acid metal salts can be used alone or in a combination of two or more.

The amount of fatty acid metal salt used when blended with a resin is preferably 0.001 to 5 parts by mass, and more preferably 0.05 to 3 parts by mass relative to 100 parts by mass of the flame retardant resin composition.

Examples of the antistatic agent include: cationic antistatic agents such as a fatty acid quaternary ammonium ion salt and a polyamine quaternary salt; anionic antistatic agents such as a higher alcohol phosphoric acid ester salt, a higher alcohol EO adduct, a polyethylene glycol fatty acid ester, an anionic alkyl sulfonic acid salt, a higher alcohol sulfuric acid ester salt, a higher alcohol ethylene oxide adduct sulfuric acid ester salt, and a higher alcohol ethylene oxide adduct phosphoric acid ester salt; nonionic antistatic agents such as a polyalcohol fatty acid ester, a polyglycolphosphoric acid ester, and polyoxyethylene alkyl allyl ether; amphoteric alkyl betaines such as an alkyl dimethyl aminoacetic acid betaine; and amphoteric antistatic agents such as an imidazoline-type amphoteric active agent. These antistatic agents can be used alone or in a combination of two or more.

The amount of antistatic agent used when blended with a resin is preferably 0.01 to 20 parts by mass, and more preferably 3 to 10 parts by mass relative to 100 parts by mass of the flame retardant resin composition.

As the pigment, a commercially available pigment can be used. Examples of the pigment include: Pigment Red 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240, and 254; Pigment Orange 13, 31, 34, 36, 38, 43, 46, 48, 49, 51, 52, 55, 59, 60, 61, 62, 64, 65, and 71; Pigment Yellow 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180, and 185; Pigment Green 7, 10, and 36; Pigment Blue 15, 15:1, 15:2, 15:3, 15:4, 15:5, 15:6, 22, 24, 56, 60, 61, 62, and 64; Pigment Violet 1, 19, 23, 27, 29, 30, 32, 37, 40, and 50, and the like. These pigments can be used alone or in a combination of two or more.

The amount of pigment used when blended with a resin is preferably 0.0001 to 10 parts by mass relative to 100 parts by mass of the flame retardant resin composition.

As the dye, a commercially available dye can be used. Examples of the dye include an azo dye, an anthraquinone dye, an indigoid dye, a triaryl methane dye, a xanthene dye, an alizarin dye, an acridine dye, a stilbene dye, a thiazole dye, a naphthol dye, a quinoline dye, a nitro dye, an indamine dye, an oxazine dye, a phthalocyanine dye, a cyanine dye, and the like. These dyes can be used alone or in a combination of two or more.

The amount of dye used when blended with a resin is preferably 0.0001 to 10 parts by mass relative to 100 parts by mass of the flame retardant resin composition.

The composition according to the present invention can be obtained by mixing essential components (A) to (C) with optional components (D) and (E) and other optional components where necessary. Any type of mixer can be used to mix the components. The components may be mixed under heat. Examples of the mixer that can be used include a turbula mixer, a henschel mixer, a ribbon blender, a V-type mixer, a W-type mixer, a super mixer, a nauta mixer, and the like.

The composition according to the present invention is effective for imparting flame retardancy to a resin, and is particularly useful as a flame retardant agent for use in a resin composition (also referred to as "resin additive"). The composition according to the present invention is preferably used as a flame retardant resin composition (hereinafter also referred to as "flame retardant resin composition according to the present invention") by being blended with a resin.

As the resin to which flame retardancy is imparted by the composition according to the present invention, a synthetic resin such as a thermoplastic resin or a thermosetting resin can be used. Specific examples of the thermoplastic resin include: thermoplastic resins such as a polyolefin-based resin, a biomass-containing polyolefin-based resin, a halogen-containing resin, an aromatic polyester resin, a linear polyester resin, a degradable aliphatic resin, a polyimide resin, a cellulose ester-based resin, a polycarbonate resin, a polyurethane resin, a polyphenylene oxide-based resin, a polyphenylene sulfide-based resin, and an acrylic resin; and blends thereof. On the other hand, examples of the thermosetting resin include a phenol resin, a urea resin, a melamine resin, an epoxy resin, an unsaturated polyester resin, and the like.

Other examples of the synthetic resin to which flame retardancy is imparted by the composition according to the present invention include an olefin-based thermoplastic elastomer, a styrene-based thermoplastic elastomer, a polyester-based thermoplastic elastomer, a nitrite-based thermoplastic elastomer, a nylon-based thermoplastic elastomer, a vinyl chloride-based thermoplastic elastomer, a polyimide-based thermoplastic elastomer, polyurethane-based thermoplastic elastomer, and the like.

These resins may be used alone or in a combination of two or more. Also, the resins may be alloyed.

The resin used in the present invention can be used irrespective of molecular weight, the degree of polymerization, density, softening point, the proportion of an insoluble in a solvent, the degree of stereo-regularity, the presence or absence of catalyst residues, the type of monomer used as a raw material, the blending ratio of the monomer, the type of polymerization catalyst (for example, a ziegler catalyst, a metallocene catalyst, or the like), and the like.

Out of the various types of resins listed above, from the viewpoint of imparting excellent flame retardancy, it is preferable to use a polyolefin-based resin or a polyurethane-based thermoplastic elastomer. Examples of the polyolefin-based resin include polyethylene, low density polyethylene, linear low density polyethylene, high density polyethylene, polypropylene, homopolypropylene, a polypropylene random copolymer, a polypropylene block copolymer, a polypropylene impact copolymer, a polypropylene high impact copolymer, isotactic polypropylene, syndiotactic polypropylene, hemi-isotactic polypropylene, maleic anhydride-modified polypropylene, polybutene, a cycloolefin polymer, stereoblock polypropylene, poly-3-methyl-1-butene, poly-3-methyl-1-pentene, poly-4-methyl-1-pentene, other α-olefin copolymers, an ethylene propylene block or random copolymer, an ethylene-methyl methacrylate copolymer, an ethylene-vinyl acetate copolymer, other α-olefin copolymers, and the like.

As the polyurethane-based thermoplastic elastomer, a thermoplastic polyurethane resin (TPU) may be used. The thermoplastic polyurethane resin (TPU) is a rubber-like elastic body that has a urethane group (-NE COO-) in its molecular structure, and includes a movable long chain portion called a soft segment and a very highly crystalline portion called a hard segment. Usually, it is produced using a polyol, a di-isocyanate, and a chain extender.

Also, thermoplastic polyurethane resin can be roughly classified into the following types according to the molding method: injection-type thermoplastic polyurethane resin that is injected into a mold while the resin is in a liquid state, and then cured; a type of thermoplastic polyurethane resin that is roll-kneaded, and then press-molded as with conventional rubber; and a type of thermoplastic polyurethane resin that that can be processed in the same manner as ordinary thermoplastic resin. However, in the present invention, any of the above thermoplastic polyurethane resins can be used.

Specific examples of the thermoplastic polyurethane resin include an ester (lactone)-based polyurethane copolymer, an ester (adipate)-based polyurethane copolymer, an ether-based polyurethane copolymer, a carbonate-based polyurethane copolymer, and an ether ester-based polyurethane copolymer. These thermoplastic polyurethane resins (TPU) can be used alone or in combination.

In the flame retardant resin composition according to the present invention, the amount of resin is preferably 50 to 99.9 mass %, and more preferably 60 to 90 mass %. In the case where the flame retardant resin composition contains the composition according to the present invention as a flame retardant agent composition, the flame retardant agent composition is contained in an amount of preferably 10 to 400 parts by mass, and more preferably 20 to 80 parts by mass relative to 100 parts by mass of the resin. By setting the amount of flame retardant agent composition to 10 parts by mass or more, sufficient flame retardancy is exhibited. By setting the amount of flame retardant agent composition to 400 parts by mass or less, physical properties that are inherent to the resin are unlikely to be impaired.

By molding the flame retardant resin composition according to the present invention, a molded article with excellent flame retardancy can be obtained. There is no particular limitation on the molding method. Examples of the molding method include extrusion processing, calender processing, injection molding, roll molding, compression molding, blow molding, and the like. A molded article of any shape such as a resin plate, a sheet, a film, or a variant can be produced The flame retardant resin composition according to the present invention and a. molded body formed therefrom can be used in a wide variety of industrial fields such as the fields of electricity, electronics, and communication, electronic and engineering, agriculture, forestry and fisheries, mining, construction, food, fiber, clothing, medicine, coal, petroleum, rubber, leather, automobiles, precision equipment, wood, construction material, civil engineering, furniture, printing, and musical instruments. More specific examples include a printer, a personal computer, a word processor, a keyboard, a PDA (personal digital assistant), a telephone, a copy machine, a facsimile, an ECR (electronic cash register), a desk calculator, an electronic notepad, an electronic card, a holder, stationery, other stationary supplies, office automation equipment, a washing machine, a refrigerator, a vacuum cleaner, a microwave oven, a lighting apparatus, a gaming console, an iron, kotatsu (a Japanese table with an electric heater), a household appliance, a TV set, a VTR, a video camera, a radio-cassette recorder, a tape recorder, a minidisk, a CD player, a speaker, a liquid crystal display, audio-visual equipment, a connector, a relay, a condenser, a switch, a printed circuit board, a coil bobbin, a semiconductor sealing material, an LED sealing material, an electric wire, a cable, a transformer, a deflecting yoke, a power distribution board, a clock, electric and electronic parts, communication equipment, housing (frame, casing, cover, exterior) and parts of office automation equipment, and automobile interior and exterior materials. Out of these, in particular, the flame retardant resin composition according to the present invention and a molded body formed therefrom are preferably used in electronic parts such as electric wires and automobile parts such as automobile interior and exterior parts.

Furthermore, the flame retardant resin composition according to the present invention and a molded body formed therefrom are used in various types of applications including: materials for use in automobiles, hybrid cars, electric automobiles, vehicles, ships, aircraft, buildings, houses and architecture such as seats (fillings, outer materials, and the like), belts, ceiling coverings, convertible tops, armrests, door trims, rear package trays, carpets, mats, sun visors, wheel covers, mattress covers, air bags, insulating materials, hand holding rings, hand holding straps, electric wire covering materials, electric insulating materials, paints, coating materials, upholstery materials, floor materials, corner walls, carpets, wallpaper, wall covering materials, exterior materials, interior materials, roofing materials, decking materials, wall materials, pillar materials, deckings, fence materials, frameworks, moldings, windows, door profiles, shingles, panels, terraces, balconies, noise insulation boards, heat insulation boards, window materials; civil engineering materials; and houseware and sporting goods such as clothes, curtains, bed sheets, plywood boards, synthetic fiber boards, rugs, doormats, sheets, buckets, hoses, containers, glasses, bags, cases, goggles, ski plates, rackets, tents, and musical instruments.

EXAMPLES

Hereinafter, the present invention will be described in further detail by way of examples. However, the present invention is not limited to the examples given below. The numerical values shown in Tables 1 to 4 given below are expressed in parts by mass.

Preparation of Composition

Compositions were obtained by blending the components other than the resins listed in Tables 1 and 2 given below at the ratios shown in the tables and mixing them using a henschel mixer. In the case where the component (E) (an epoxy-based coupling agent, a lubricant and/or silicone oil) was blended, the components other than the component (E) were pre-mixed, and thereafter the component (E) was added and mixed using a henschel mixer.

Preparation of Flame Retardant Resin Composition

Examples 1 to 6, and Comparative Examples 1 to 6

A thermoplastic polyurethane resin composition was obtained by blending 0.1 parts by mass of calcium stearate, 0.3 parts by mass of glycerin monostearate, 0.1 parts by mass of tetrakis[3-(3,5-di-tert-butyl-4-hydroxyphenyl)propanoic acid methyl]methane, and 0.1 parts by mass of 2,2'-methylenebis(4,6-di-tert-butyl phenyl)-2-ethylhexylphosphite with 100 parts by mass of thermoplastic polyurethane resin (Elastollan 1185A available from BASF), and pre-mixing them using a henschel mixer. Then, a resin composition was obtained by blending the obtained thermoplastic polyurethane resin composition with each of the compositions prepared using components shown in Table 1 or 2 at the ratios (part by mass) shown in the tables, and mixing them using a henschel mixer.

Examples 7 to 12, and Comparative Examples 7 to 12

A polypropylene resin composition was obtained by blending 0.1 parts by mass of calcium stearate (higher fatty acid metal salt), 0.1 parts by mass of tetrakis[3-(3,5-di-tert-butyl-4-hydroxyphenyl)propanoic acidmethyl]methane (phenol-based antioxidizing agent), and 0.1 parts by mass of tris(2,4-di-tert-butyl phenyl)phosphite (phosphorus-based antioxidizing agent) with 100 parts by mass of polypropylene (with a melt flow rate of 8 g/10 min, the melt flow rate being measured at 230° C. under a load of 2.16 kg in accordance with HS K7210), and pre-mixing them using a henschel mixer. Then, a resin composition was obtained by blending the obtained polypropylene resin composition with each of the compositions prepared using the components shown in Table 1 or 2 at the ratios (part by mass) shown in the tables, and mixing them using a henschel mixer.

Pellets were produced in the following manner using each of the resin compositions obtained above, and specimens for flame retardancy evaluation were produced from the pellets. The specimens were subjected to flame retardancy evaluation and moldability evaluation. The results are shown in Tables 1 and 2 given below, Evaluation Flame Retardancy Evaluation Each of the resin compositions of Examples 1 to 6 and Comparative Examples 1 to 6 that contained a thermoplastic polyurethane resin was melt kneaded at a cylinder temperature of 190 to 200° C. and a screw speed of 150 rpm using a biaxial extrusion molding machine (TEX-30α available from Japan Steel Works, Ltd.). Strands discharged from the die were cooled using a cooling bus and cut using a pelletizer. In this way, resin composition pellets were produced.

Each of the resin compositions of Examples 7 to 12 and Comparative Examples 7 to 12 that contained a polypropylene resin was melt kneaded at a cylinder temperature of 220 to 230° C. and a screw speed of 150 rpm using a biaxial extrusion molding machine (TEX-30α available from Japan Steel Works, Ltd.). Strands discharged from the die were cooled using a cooling bus and cut using a pelletizer. In this way, resin composition pellets were produced.

The resin composition pellets obtained above were subjected to injection molding using NEX-80 available from Nissei Plastic Industrial Co., Ltd., and specimens for flame retardancy evaluation, each having a length of 127 mm, a width of 12.7 mm, and a thickness of 1.6 mm, were obtained. In Examples 1 to 6, and Comparative Examples 1 to 6, the screw temperature was set to 200° C., and the die temperature was set to 40° C. In Examples 7 to 12, and Comparative Examples 7 to 12, the screw temperature was set to 230° C., and the die temperature was set to 40° C.

Each of the obtained specimens was subjected to 20 mm vertical combustion test (UL-94V) in accordance with ISO 1210. Specifically, the specimen was held vertically, and a burner flame was applied to the lower end of the specimen for 10 seconds, and then the burner flame was removed. The time required for the flame on the specimen to extinguish was measured. Then, at the same time when the flame extinguished, a burner flame was applied for 10 seconds for the second time, and the time required for the flame on the specimen to extinguish was measured in the same manner as in the first time. Evaluation was also made by checking whether or not a cotton piece provided under the specimen caught fire by a flame dropping thereon. Flame retardancy rating was determined in accordance with the UL-94V standard based on the first combustion time, the second combustion time, whether or not the cotton piece caught fire, and the like. As the flame retardancy rating, V-0 indicates the highest level, and flame retardancy decreases in the order of V-1 to V-2. A rating of NR is given when a specimen does not correspond to any of the ratings V-0 to V-2. The evaluation results are shown in Tables 1 and 2 below.

Moldability Evaluation

The resin composition pellets obtained above were subjected to injection molding using NI X-80 available from Nissei Plastic Industrial Co., Ltd., and molded bodies, each having a length of 100 mm, a width of 100 mm, and a thickness of 3 mm, were obtained. The injection molding was performed 30 times, and the die surface was visually observed for mold deposits, and evaluation was made based on the following criteria. In Examples 1 to 6, and Comparative Examples 1 to 6, the screw temperature was set to 180° C., and the die temperature was set to 40° C. In Examples 7 to 12, and Comparative Examples 7 to 12, the screw temperature was set to 230° C., and the die temperature was set to 40° C.

Criteria for Moldability Evaluation

○: No mold deposits were observed on the die surface.

Δ: A small amount of mold deposits were observed on the die surface.

x: A significant amount of mold deposits were observed on the die surface.

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Resin | Thermoplastic polyurethane *1) | 70 | 70 | 70 | 70 | 70 | 70 | | | | | | |
| | Polypropylene *2) | | | | | | | 70 | 70 | 70 | 70 | 70 | 70 |
| Component (A) | Melamine polyphosphate | 6 | 12 | | | | | 6 | 12 | | | | |
| | Melamine pyrophosphate | | | 6 | 12 | 12 | | | | 6 | 12 | 12 | |
| | Melamine orthophosphate | | | | | | 15 | | | | | | 15 |
| Component (B) | Piperazine polyphosphate | 24 | 18 | | | | | 24 | 18 | | | | |
| | Piperazine pyrophosphate | | | 24 | 18 | 18 | | | | 24 | 18 | 18 | |
| | Piperazine orthophosphate | | | | | | 15 | | | | | | 15 |
| Component (C) | Monohydrate of alumina *3) | 1.5 | 1.5 | 1.5 | 1.5 | 3 | 1.5 | 1.5 | 1.5 | 1.5 | 1.5 | 3 | 1.5 |
| Component (D) | Zinc oxide *4) | 1.5 | 1.5 | 1.5 | 1.5 | 1.5 | 1.5 | 1.5 | 1.5 | 1.5 | 1.5 | 1.5 | 1.5 |
| Component (E) | Silicone oil *5) | 0.15 | | 0.09 | | | | 0.15 | | 0.09 | | | |
| | Epoxy-based coupling agent *6) | | 0.09 | | 0.3 | 0.3 | | | 0.09 | | 0.3 | 0.3 | |
| | Hydrotalcite *7) | | | 0.15 | | | | | | 0.15 | | | |
| | Lubricant *8) | | | | 0.03 | 0.03 | 0.03 | | | | 0.03 | 0.03 | 0.03 |
| Flame retardancy | | V-1 | V-1 | V-0 | V-0 | V-0 | V-1 | V-1 | V-1 | V-1 | V-0 | V-0 | V-1 |
| Moldability | | ○ | ○ | ○ | ○ | ○ | ○ | ○ | ○ | ○ | ○ | ○ | ○ |

*1) Ellastollan 1185A (available from BASF)
*2) Melt flow rate = 8 g/10 min, the melt flow rate being measured at 230° C. under a load of 2.16 kg in accordance with JIS K7210
*3) Cerasur BMB (available from Kawai Lime Co.)
*4) Zinc oxide class 1 (available from Mitsui Mining & Smelting Co., Ltd.)
*5) KF-99 (available from Shin-Etsu Silicone Co., Ltd.)
*6) Molecular weight: 246.4 and specific gravity: 1.07 (available from Nichibi Trading Co., Ltd.)
*7) DHT-4A(Kyowa Chemical Industry Co., Ltd.)
*8) Adipic acid ether ester-based lubricant [molecular weight: 434, specific gravity: 1.020, and SP value: 9.2] (available from ADEKA)

TABLE 2

| | | Comparative Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Resin | Thermoplastic polyurethane *1) | 70 | 70 | 70 | 70 | 70 | 70 | | | | | | |
| | Polypropylene *2) | | | | | | | 70 | 70 | 70 | 70 | 70 | 70 |
| Component (A) | Melamine polyphosphate | | | | | | | | | | | | |
| | Melamine pyrophosphate | 18 | | 30 | 18 | | | 18 | | 30 | 18 | | |
| | Melamine orthophosphate | | | | | | | | | | | | |
| Component (B) | Piperazine polyphosphate | | | | | | | | | | | | |
| | Piperazine pyrophosphate | 12 | 30 | | 12 | | | 12 | 30 | | 12 | | |
| | Piperazine orthophosphate | | | | | | | | | | | | |
| Phosphoric acid ester *9) | | | | | | 30 | | | | | | 30 | |
| Phosphoric acid ester *10) | | | | | | | 30 | | | | | | 30 |
| Component (C) | Monohydrate of alumina *3) | | 1.5 | 3 | | 1.5 | 3 | | 1.5 | 3 | | 1.5 | 3 |
| Component (D) | Zinc oxide *4) | 1.5 | 1.5 | 1.5 | | 1.5 | 1.5 | 1.5 | 1.5 | 1.5 | | 1.5 | 1.5 |
| Component (E) | Silicone oil *5) | | | | | | | | | | | | |
| | Epoxy-based coupling agent *6) | 0.3 | 0.3 | 0.3 | 0.3 | 0.3 | 0.3 | 0.3 | 0.3 | 0.3 | 0.3 | 0.3 | 0.3 |
| | Hydrotalcite *7) | | | | | | | | | | | | |
| | Lubricant *8) | 0.03 | 0.03 | 0.03 | 0.03 | 0.03 | 0.03 | 0.03 | 0.03 | 0.03 | 0.03 | 0.03 | 0.03 |

TABLE 2-continued

| | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Flame retardancy | V-2 | NR | NR | V-2 | NR | NR | V-2 | NR | NR | V-2 | NR | NR |
| Moldability | x | Δ | Δ | x | x | x | x | Δ | Δ | x | x | x |

*1) Ellastollan 1185A (available from BASF)
*2) Melt flow rate = 8 g/10 min, the melt flow rate being measured at 230° C. under a load of 2.16 kg in accordance with JIS K7210
*3) Cerasur BMB (available from Kawai Lime Co.)
*4) Zinc oxide class 1 (available from Mitsui Mining & Smelting Co., Ltd.)
*5) KF-99 (available from Shin-Etsu Silicone Co., Ltd.)
*6) Molecular weight: 246.4 and specific gravity: 1.07 (available from Nichibi Trading Co., Ltd.)
*7) DHT-4A (Kyowa Chemical Industry Co., Ltd.)
*8) Adipic acid ether ester-based lubricant [molecular weight: 434, specific gravity: 1.020, and SP value: 9.2] (available from ADEKA)
*9) PX-200 (available from Daihachi Chemical Industry Co., Ltd.)
*10) PX-202 (available from Daihachi Chemical Industry Co., Ltd.)

As is clear from the results shown in Table 1, Examples in which a composition containing the component (A), the component (B), and the component (C) was blended with a resin exhibited good results in both the flame retardancy evaluation test in accordance with UL-941V standard and the moldability evaluation. In contrast, as shown in Table 2, Comparative Examples 1, 4, 7, and 10 in which the component (C) was not used, Comparative Examples 2, 3, 8, and 9 in which one of the component (A) and the component (B) was not used, and Comparative Examples 5, 6, 11, and 12 in which a phosphoric acid ester compound was used instead of the component (A) and the component (B) exhibited poor results in both the flame retardancy evaluation and the moldability evaluation.

From the above results, it can be seen that the composition according to the present invention can impart high levels of flame retardancy and moldability to a resin, and is therefore excellent as a flame retardant agent.

INDUSTRIAL APPLICABILITY

According to the present invention, it is possible to provide a composition that can impart excellent levels of processability/moldability and flame retardancy to a resin by being mixed with the resin, and a flame retardant resin composition that contains the composition and a resin and has excellent levels of processability/moldability and flame retardancy.

The invention claimed is:

1. A composition comprising the following components (A), (B), and (C),
   the component (A) being melamine pyrophosphate,
   the component (B) being piperazine pyrophosphate, and
   the component (C) being an aluminum hydrated oxide represented by the formula $Al_2O_3 \cdot nH_2O$, where n is 1 or more and less than 2,
   wherein the amount of component (A) is 20 to 40 parts by mass relative to 100 parts by mass of a total of the component (A) and the component (B), and the amount of component (B) is 80 to 60 parts by mass relative to 100 parts by mass of a total of the component (A) and the component (B), and
   wherein the component (C) is contained in an amount of 3 to 10 parts by mass relative to 100 parts by mass of a total of the component (A) and the component (B).

2. The composition according to claim 1, further comprising
   zinc oxide as a component (D) in an amount of 0.01 to 10 parts by mass relative to 100 parts by mass of a total of the component (A) and the component (B).

3. The composition according to claim 1, further comprising
   at least one selected from the group consisting of silicone oil, an epoxy-based coupling agent, a hydrotalcite, and a lubricant as a component (E) in an amount of 0.01 to 5 parts by mass relative to 100 parts by mass of a total of the component (A) and the component (B),
   wherein the composition is used mixed with a resin.

4. A method for imparting flame retardancy to a resin, the method comprising mixing a composition that contains the following components (A), (B), and (C) with a resin,
   the component (A) being melamine pyrophosphate,
   the component (B) being piperazine pyrophosphate, and
   the component (C) being an aluminum hydrated oxide represented by the formula $Al_2O_3 \cdot nH_2O$, where n is 1 or more and less than 2,
   wherein the amount of component (A) is 20 to 40 parts by mass relative to 100 parts by mass of a total of the component (A) and the component (B), and the amount of component (B) is 80 to 60 parts by mass relative to 100 parts by mass of a total of the component (A) and the component (B), and
   wherein the component (C) is contained in an amount of 3 to 10 parts by mass relative to 100 parts by mass of a total of the component (A) and the component (B).

5. A method of treating a material to be flame retardant, comprising applying to the material an effective amount of a composition that contains the following components (A), (B), and (C) as a flame retardant agent,
   the component (A) being melamine pyrophosphate,
   the component (B) being piperazine pyrophosphate, and
   the component (C) being an aluminum hydrated oxide represented by the formula $Al_2O_3 \cdot nH_2O$, where n is 1 or more and less than 2,
   wherein the amount of component (A) is 20 to 40 parts by mass relative to 100 parts by mass of a total of the component (A) and the component (B), and the amount of component (B) is 80 to 60 parts by mass relative to 100 parts by mass of a total of the component (A) and the component (B), and
   wherein the component (C) is contained in an amount of 3 to 10 parts by mass relative to 100 parts by mass of a total of the component (A) and the component (B).

6. The composition according to claim 3, further comprising
   at least one selected from the group consisting of silicone oil, an epoxy-based coupling agent, a hydrotalcite, and a lubricant as a component (E) in an amount of 0.01 to 5 parts by mass relative to 100 parts by mass of a total of the component (A) and the component (B),
   wherein the composition is used mixed with a resin.

* * * * *